United States Patent
Rieber et al.

(10) Patent No.: US 6,524,543 B1
(45) Date of Patent: Feb. 25, 2003

(54) PRODUCTION OF SOLUBLE SILICATES FROM BIOGENIC SILICA

(76) Inventors: Roy S. Rieber, 1302 Walnut Bend, Houston, TX (US) 77042; William A. Mallow, 10041 Rafter S Trail, Helotes, TX (US) 78023; Jesse R. Conner, 1001 Torrey Pines Ct., Darien, IL (US) 60559

(*) Notice: Subject to any disclaimer, the term of this patent is extended or adjusted under 35 U.S.C. 154(b) by 0 days.

(21) Appl. No.: 09/139,236

(22) Filed: Aug. 25, 1998

Related U.S. Application Data

(62) Division of application No. 07/842,915, filed on Feb. 27, 1992, now Pat. No. 5,833,940, which is a continuation-in-part of application No. 07/483,440, filed on Feb. 7, 1990, now abandoned, which is a continuation of application No. 07/225,107, filed on Jul. 27, 1988, now abandoned.

(51) Int. Cl.[7] ............................................... C01B 33/32
(52) U.S. Cl. ....................................... 423/332; 106/600
(58) Field of Search ........................... 423/332; 106/634, 106/600; 502/412, 411, 407

(56) References Cited

U.S. PATENT DOCUMENTS

| | | | |
|---|---|---|---|
| 1,293,008 A | * 2/1919 | Blandone | 423/335 |
| 3,715,224 A | * 2/1973 | Campbell | 106/634 |
| 3,951,834 A | * 4/1976 | Gillilan | 106/601 |
| 4,619,911 A | * 10/1986 | Goodwin et al. | 502/411 |
| 4,676,964 A | * 6/1987 | Seki et al. | 423/335 |

* cited by examiner

*Primary Examiner*—Stuart L. Hendrickson
(74) *Attorney, Agent, or Firm*—James F. Weiler

(57) ABSTRACT

Disclosed is a commercial grade of soluble silicate solutions, clear homogenous and water white essentially free of unreacted silica, made by dissolving in a closed container biogenic silica, preferably rice hull ash, in a strong alkali solution, preferably sodium hydroxide in the presence of an agent, such as an active carbonaceous material, which prevents discoloration of the soluble silicates by absorbing and/or reacting with polyvalent metals, organic materials, and the like, in the biogenic silica as it dissolves in and reacts with the alkali solution. The invention takes advantage of the residue of such active carbonaceous material on the biogenic silica, such as rice hulls, left by commercial energy burning thereof which effectively prevents discoloration. A solid residue results from the method which is an active carbonaceous material including concentrated manganese from the biogenic silica, both of which are valuable commercial products.

2 Claims, No Drawings

PRODUCTION OF SOLUBLE SILICATES FROM BIOGENIC SILICA

CROSS-REFERENCE to RELATED APPLICATION

This application is a continued prosecution application of application Ser. No. 09/139,236 filed Aug. 25, 1998, which is a division of application Ser. No. 07/842,915 filed Feb. 27, 1992 (now U.S. Pat. No. 5,833,940 granted Nov. 10, 1998), which is a continuation-in-part application of application Ser. No. 07/483,440, filed Feb. 7, 1990 now abandoned, which is a continuation application of application Ser. No. 07/225,107, filed Jul. 27, 1988 now abandoned, which claimed priority of UK 8717861 filed Jul. 28, 1987.

FIELD OF THE INVENTION

The present invention relates to the production of soluble silicates from biogenic silica in substantially amorphous state.

BACKGROUND OF THE INVENTION

Soluble silicates are compositions in which sodium oxide and silica are combined in varying proportions, usually with some water. The different proportions allow a wide range of properties and applications. The proportion of silica to sodium oxide is expressed on a mole ratio basis with ratios ranging from 3.85 to 0.5. They are produced as either solids or water solutions—liquids—with the liquids usually made as concentrated as can be handled in the commercial applications. In 1977, the production of sodium silicate in the United States was about 760,000 tons for the most common grade—"water glass"—with a ratio of silica to sodium oxide of 3.2. Other grades, mostly more alkaline (lower ratio), made up another 210,000 tons in that same year. Some of the principal uses of sodium silicates are: adhesives and cements; coatings; gels and catalysts; silica sols and water treatment; detergents and soaps; foundry molds and cores; drilling muds; soil stabilization; chemical fixation/solidification of wastes.

Sodium silicate is conventionally made by fusing high purity soda-ash and silica sand in furnaces at temperatures of 1300° to 1500° C. and higher to produce a solid glass. The liquid is made by dissolving the glass with steam and hot water. This is known as the open hearth process which is the foundation of all commercial processes for making sodium silicate today. Both processes are very energy intensive. Therefore, any method which requires the use of less energy is advantageous and potentially competitive.

U.S. Pat. No. 1,293,008 (Blardone) discloses a boiling procedure for various lengths of time for producing a form of water glass from sodium silicate and sodium hydroxide; however, the boiling process cannot produce ratios higher than 1.5:1 of silica to sodium oxide. In subsequent paragraphs a fusion process is disclosed wherein sodium carbonate or sodium sulfate is fused with rice hull ash. While any ratio of sodium silicate desired can be produced by this fusion process, the energies adequate to couple sodium and silica at various ratios are at temperatures well over 2,000 to 3,000° F. These fusion products are then boiled in water to produce solutions, the open hearth process.

In U.S. Pat. No. 4,488,908 (Goodwin, et al.) ash and sodium hydroxide solutions are heated in an open container to give dry, but hydrated solids. Even when the hydrated solids are added to water, about 25% of the original mass would dissolve generating a slurry of unreacted ash in the sodium metasilicate (1:1 ratio).

As described in more detail subsequently herein, the present invention is directed to producing sodium silicate solutions with biogenic silica which is clear and homogenous, essentially free of unreacted silica and comprising controlled ratios of silica to sodium oxide, both with respect to the feed stock and the recovered product. The yields obtained by the hydration process of this invention are close to theoretical.

In obtaining soluble silicates from, biogenic silica, such as rice hull ash, in which the hull fibers have been burned off, the resulting soluble silicates have an amber color which is very difficult to remove. For example, attempts to remove the amber color proved inadequate by the following material and methods: activated carbon (perculation and filtration); activated, amorphous silica; zeolites (perculation and filtration); ion exchange resins; EDTA (ethylenediaminetetraacetic acid disodium salt); black rice hull ash (original and residual); PHPAA (partially hydrolyzed poly acrylic acid); sodium peroxide; chlorine; silica foam; silicate foam; and sodium gluconate.

Since commercial grades of soluble silicates, such as sodium silicate, are water white, the amber color is unacceptable for most commercial applications.

Commercially available rice hull ash is prepared by burning rice hulls as an energy source in a furnace. In the process, raw rice hulls are continuously added to the top of the furnace and the ash is continuously removed from the bottom. Temperatures in the furnace range from 800° to about 1400° C., and the time factor for the ash in the furnace is about three minutes. Upon leaving the furnace, the ash is rapidly cooled to provide ease in handling. When treated by this method, silica remains in a relatively pure amorphous state rather than in the crystalline forms known as quartz, tridymite or crystobalite. Transition from the amorphous to the crystalline state generally takes place when the silica is held at very high temperatures, for example 2000° C., or longer periods of time. The significance of having the silica in an amorphous state is that the silica ash maintains a porous skeletal structure rather than migrating to form crystals, and the amorphous form of silica does not cause silicosis thus reducing cautionary handling procedures. The burning of the rice hulls is time-temperature related, and burning of these hulls under other conditions can be done so long as most of the ash is in an amorphous state with a porous skeletal structure.

On a commercial burning of rice hulls as an energy source, the resultant ash had the following chemical analysis (by weight):

TABLE 1

| | |
|---|---|
| $SiO_2$ | 93 percent |
| Carbon | 5.5 percent |
| Moisture | <1 percent |

The remaining ½ percent by weight which converts to 5,000 parts per million (5000 ppm) by weight consists of minor amounts of magnesium, barium, potassium, iron, aluminum, calcium, copper, nickel mangonese, and sodium. Apparently, it is these metal salts, as well as organic material, which impart the amber color to the sodium silicates and which are very difficult to remove once the soluble silicate is formed.

The carbon content was in a dispersed state throughout the material. Depending upon the time and temperature of burning of the biogenic source of silica, and the particular furnace used, the carbon content can vary considerably, for example, up to and above 12%.

SUMMARY OF THE INVENTION

The present invention comprises a hydration method of making soluble silicates such as sodium silicates by dissolving biogenic silica in aqueous alkali solution such as sodium and potassium hydroxide in a closed container. By controlled burning of the rice hull ash, a "black ash" can be obtained with a residual carbonaceous content. This provides a method and material which, surprisingly, generates a clear, homogenous water white solution of alkali silicate when digested in aqueous sodium or potassium hydroxide in a closed container at temperatures and pressures which do not cause discoloration by the inherent organic material and trace minerals of the ash. Temperatures from ambient to the order of 275° F. are suitable for most black ash. Higher temperatures and pressures may cause discoloration, for example, by the breakdown of the carbonaceous residue. While the mechanism of the prevention of the color formation is not known, it is possible that the carbonaceous residue in the ash is similar to "activated carbon" which may absorb or react with color forming agents before they are released to the alkali solution during the digestion of the ash. Surprisingly, perculation or filtration of amber colored sodium silicate through a bed or column of "black ash" did not remove the color. The isolated black residue recovered from the digestion of black ash in alkaline solution was also ineffective in removing color from an amber solution. Such amber solutions result from biogenic silicas which contain less than 1% carbonaceous matter.

Accordingly, it is an object of the present invention to provide a method of producing a soluble silicate solution in which biogenic silica, in a closed container is dissolved in a strong alkali solution effective to produce the soluble silicate, in the presence of an active carbonaceous material in an amount sufficient to absorb or react with the inherent organic material or minerals thereby preventing discoloration of the soluble silicate by the minerals or organic materials in the biogenic silica during the dissolution thereof, thus producing a clear and homogenous soluble silicate solution essentially free of unreacted silica.

It is a further object of the present invention to provide a method of producing such a clear and homogenous soluble silicate solution by a less energy intensive process than current processes for producing soluble silicates.

It is a further object of the present invention to provide a hydration method of producing a soluble silicate solution from rice hull ash having an active carbonaceous material dispersed throughout in an amount effective to prevent the discoloration of the soluble silicate during dissolution of the rice hull ash.

It is a further object of the present invention to provide a clear, homogenous soluble silicate solution free of unreacted silica made from dissolving in a closed container a biogenic silica, such as rice hull ash, in a strong alkali solution effective to dissolve the biogenic silica and produce the water soluble silicate in the presence of a carbonaceous material effective to prevent discoloration of the soluble silicate by extraneous matter in the rice hull ash, such as organic material, metal salts, and the like.

It is a further object of the invention to provide such a method in which a valuable residue results, that is activated carbonaceous materials and concentrated manganese converted from the oxide or silicate of manganese of the biogenic silica, both of which have commercial applications.

Other and further objects, features, and advantages of the invention are set forth throughout the specification and claims and are inherent in the invention.

DESCRIPTION OF PRESENTLY PREFERRED EMBODIMENTS

The invention is directed to the production of a commercial soluble silicate, that is one which is clear and homogenous and water white, formed by the dissolution, in a closed container, of biogenic silica in a strong alkali solution effective to produce such a soluble silicate in the presence of an agent, such as a carbon compound dispersed throughout which prevents discoloration of the soluble silicate by metal salts, organic materials, and the like in the biogenic silica.

The biogenic silica is obtained by the controlled burning of biogenic materials containing silica, such as rice hulls, rice stalks, esquitum (horsetail weed), bagasse, certain bamboo palm leaves, particularly palmyra, pollen and the like. The burning of the biogenic material is done under controlled conditions so that substantially all of the silica is in an amorphous rather than a crystalline state although minor amounts of crystalline silica can be present, as previously set forth. Preferably, the biogenic materials are burned so that there is a residue of from about 2% to 8% of carbonaceous material present. In most commercial burnings, there will be approximately 0.5% to 8% or more of carbonaceous material (by weight) dispersed throughout the rice hull ash depending on the time and temperature of burning. It is only necessary to have sufficient carbon present to prevent discoloration. The rice hulls may be burned along with other biogenic materials, such as wood chips, corn cobs and the like which increase the carbon residue. Excess carbon is not harmful to the reaction.

Advantageously, the biogenic silica, such as rice hull ash, is dissolved in a closed container in a strong alkali solution effective to provide a solution of soluble silica, such as sodium or potassium silicate, at or above ambient temperature or atmospheric pressures or both. At elevated temperature and pressure, the reaction takes less time. Advantageously, the present invention does not require the use of high temperatures and pressures such as dissolving special grade quartz in a strong alkali solution as in the prior art processes. The strong alkali solution should have a pH of about 12 or greater. The alkali can be pure sodium hydroxide or reaction products of calcium oxide and sodium carbonate or sodium hydroxides as by-product liquors and the like.

A series of experiments were performed on the dissolution of rice hull ash (RHA) in sodium hydroxide to form a solution of sodium silicate. There is no question that the RHA is being dissolved to a large degree by the sodium hydroxide and converted to a sodium silicate. While the products of these tests were not analyzed for silica, they were titrated for total alkali and total solids from which the silica was computed. In addition, the solutions were tested for gelling ability with dilute acid. All exhibited strong gelling, indicating the presence of substantial dissolved and/or colloidal silica/silicate. This dissolution of RHA occurs fairly rapidly and at low temperature and ambient pressure. In the absence of a discoloration preventive agent, the soluble silicate had an amber color which is undesirable for many commercial applications. This color appears to be due mostly to the presence of partially burned hulls or other organic matter, and/or small concentrations of metals, such as iron, manganese, copper or chromium intrinsic to the RHA. The discoloration was prevented by dissolving the RHA in the presence of a discoloration preventing agent, such as activated carbon. Advantageously, commercial energy burning of rice hulls leaves about a 2½ to 8% by weight of a carbonaceous residue on the ash which absorbs or reacts with the organic matter and metals and thereby prevents this discoloration.

In some furnaces, for example, those using fluidized beds extraneous impurities are added to the ash which should be screened out.

The following sets forth a series of experiments of the dissolution of rice hull ash (RHA) in substantially amorphous state in sodium hydroxide to form a solution of sodium silicate in the presence of about 2½ % to 8% (by weight) carbon.

Experiments were conducted in a closed container at room temperature, 100°F., 212° F., 275° F., using 1/2, 1/1, and 2/1 ratios of silica/sodium oxide in all cases except the 275° F. experiment. Concentrations of 25–30% solids were used in most cases in the aqueous system. The solutions were aged for one to seven days and the following observations derived:

DESCRIPTION OF PRESENTLY PREFERRED EMBODIMENTS

Results of Experiments at Room Temperature

At room temperature, a 15% solution of 1/2 ratio (silica/sodium oxide) resulted from all three ratio solutions after a seven day incubation period.

DESCRIPTION OF PRESENTLY PREFERRED EMBODIMENTS

Charged 2/1, 1/1, and 1/2 Ratios $SiO_2/NA_2O$ of 25% Total Solids 1 day=8% solution of 1/1.5 ratio ($SiO_2/Na_2O$) from the 2/1 ratio; the remaining solutions were even more alkaline.

2 day=11% solution of 1/1.5 ratio ($SiO_2/Na_2O$) from the 2/1 ratio; the remaining solutions were even more alkaline.

3 day=12.5% solution of 1/1.25 ratio ($SiO_2/Na_2O$) from the ⅔ ratio; the remaining solutions were even more alkaline.

7 day=14% solution of 1/1.15 ratio ($SiO_2/Na_2O$) from the 2/1 ratio; the remaining solutions were even more alkaline.

EXAMPLE 3

Results of Experiments at 212° F.
Charged 2/1, 1/1, and 1/2 Ratios of $SiO_2/NA_2O$ at 32% Total Solid Solution 1 hr=12% solution of 1/1.1 ($SiO_2Na_2O$) from 2/1 ratio; remaining solutions were even more alkaline.

24 hr=23% solution of 1.5/1 ($SiO_2/Na_2O$) from 2/1 ratio; remaining solutions were even more alkaline.

48 hr=25% solution of 1.8/1 ($SiO_2/Na_2O$) from 2/1 ratio; remaining solutions were even more alkaline.

72 hr=26.5% solution of 2.05/1 ($SiO_2/Na_2O$) from 2/1 ratio; remaining solutions were even more alkaline.

From the above, over 70% of solids were reacted at 212° F. in 24 hours; 83% in 72 hours. The resulting solutions were clear, homogenous and essentially free of unreacted silica. The lower silica ratio solutions were more alkaline than the 2/1 . Low silica (1/1 to 1/2 ) solutions are easily obtained even at room temperature.

The unreacted ash recovered from the 212° F. study was very black and essentially finely divided with a coarser but friable fraction of about 25%. Microscopic examination revealed fragments of opalescent silicate laced with silvery metal particles. X-ray fluorescence of the recovered fraction indicated an unexpected, relative high and enhanced concentration of what appears to be manganese metal. The carbon apparently serves as a reducing agent and converts the oxide or silicate of manganese to elemental manganese.

At high temperatures and pressures, that is above about 275° F., some discoloration takes place. By simple experiments, optimum temperatures and pressures up to about 275° F. can be determined to produce a clear homogenous soluble silicate solution economically.

The following examples 4–8 illustrate the effect of temperatures above 275° F. on the color of the resulting soluble silicate solution.

EXAMPLE 4

250° F., 30 psi/1 hr* Charged 3.4/1 Ratio of $SiO_2/Na_2O$ at 29% total solids 1 hr=24.5% solution of 3.1/1 ratio $SiO_2/Na_2O$; 93% yield; 5% carbon residue; 92.7% material balance (losses in handling, transfer, etc.). Solutions were colorless and clear.

EXAMPLE 5

275° F./1 hr (45 psia)* Charged 3.4/1 Ratio of $SiO_2/Na_2O$, 32% Solids 1 hr=25% solution of 3.05 ratio $SiO_2/Na_2O$ at 94.5% yield, 93% material balance, 4.8% carbon residue. Solution-colorless and clear.

EXAMPLE 6

300° F., 67 psia/1 hr* Charged 3.4/1 Ratio $SiO_2/Na_2O$ at 32% Solids 1 hr=25.5% solids at 3.2 ratio $SiO_2/Na_2O$. Solution—pale, straw colored, clear.

EXAMPLE 7

325° F. 94 psia/1 hr* Charged 3.4/1 Ratio $SiO_2/Na_2O$ at 32% Solids 1 hr=26% solution of 3.25/1 ratio $SiO_2/Na_2O$; straw colored, clear.

EXAMPLE 8

350° F. 134 psia/1hr* Charged 3.4/1 ratio $SiO_2/Na_2O$ at 32% solids 1 hr=26.5% solution, 3.25/1 $SiO_2/Na_2O$; straw colored, clear.

Heat up times approximately 20 minutes sustained at temperature for 1 hour and quenched in cold water immediately after removal from oven.

In the foregoing examples, in addition to sodium hydroxide, sodium carbonate/calcium oxide reaction products, sodium hydroxides by-product liquors and low grade soda ash/lime sources of sodium hydroxides can be used and a water white soluble silicate obtained.

The other biogenic silica particles mentioned before can be substituted for rice hull silica in the above examples with substantially the same results.

If desired, the soluble silicate solution can be frothed to form a foam by air entrapment by known methods involving mechanical agitation, such as described in U.S. Pat. No. 3,856,539.

From the foregoing, commercial grades, that is clear, homogenous free of unreacted silica sodium silicate solutions can be produced from various biogenic silicas with simple, low cost equipment and low energy input molar ratios of silica to sodium oxide of 1.0 to 2.0 have been produced by simply varying the proportions of biogenic silica to the strong alkali solutions and higher ratios can be obtainable as well. The solids concentrations can be controlled by water addition up the point where the solutions become very viscous.

In addition to the foregoing, the carbonaceous residue was primarily activated carbon which is valuable in many commercial applications. For example, in using RHA, up to about 8% of the RHA resulted in activated carbon. In burning rice stalks, up to about 12% of the stalks resulted in activated carbon.

In addition to the foregoing, as mentioned previously, manganese appears to be concentrated in the carbonaceous residue, which can be extracted by conventional procedures and is quite valuable.

As previously mentioned, advantageously the color is controlled by preventing discoloration of the sodium silicate during the dissolving of the carbonaceous biogenic silica in the strong alkali solution.

While presently preferred examples of the embodiments of the invention have been given for the purposes of disclosures, changes can be made therein which are within the spirit of the invention as defined by the scope of the appended claims.

What is claimed is:

1. A clear, uncolored, and water white silicate solution containing dissolved and reacted silica from ash of burned biogenic material, said solution containing at most an amount of 0.05% by weight (500 ppm by weight) of metal contaminants and free of undissolved and unreacted silica, suspended particles of organic material and carbonaceous material.

2. The silicate solution of claim 1 where, the biogenic ash comprises rice hull ash.

* * * * *